Aug. 18, 1931.   M. M. TITTERINGTON   1,819,488
INDUCTOR COMPASS GENERATOR
Original Filed March 11, 1922
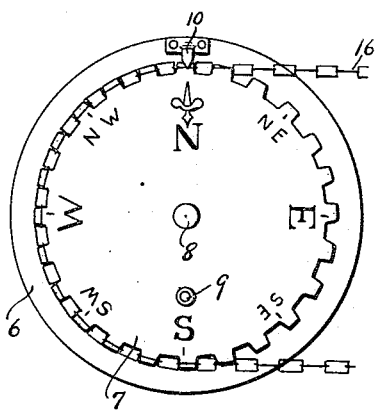
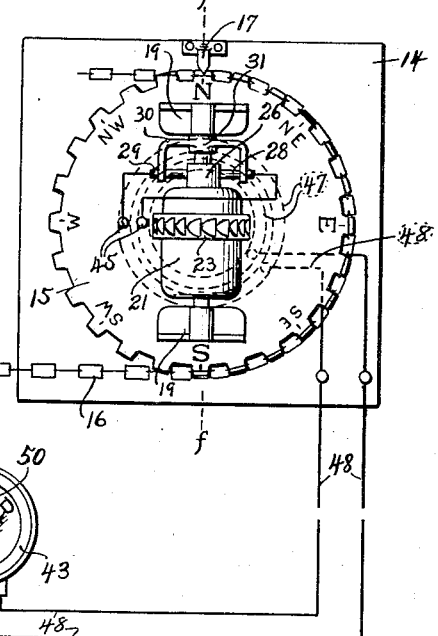
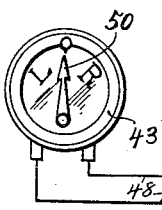
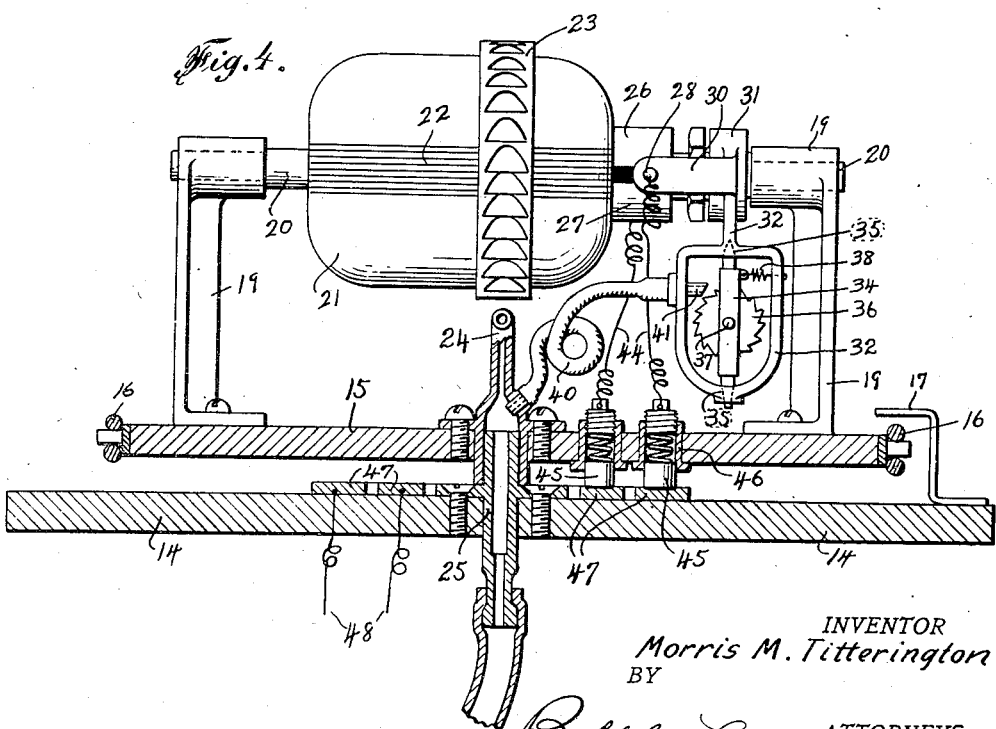
INVENTOR
Morris M. Titterington
BY
Bohleber + Ledbetter
ATTORNEYS Patented Aug. 18, 1931

1,819,488

UNITED STATES PATENT OFFICE

MORRIS M. TITTERINGTON, OF BROOKLYN, NEW YORK; GEORGE A. TITTERINGTON, EXECUTOR OF SAID MORRIS M. TITTERINGTON, DECEASED, ASSIGNOR TO PIONEER INSTRUMENT COMPANY, INCORPORATED, OF BROOKLYN, NEW YORK, A CORPORATION OF NEW YORK

INDUCTOR COMPASS GENERATOR

Original application filed March 11, 1922, Serial No. 542,937, now Patent No. 1,770,243, dated July 8, 1930. Divided and this application filed August 29, 1925. Serial No. 53,270.

This invention relates to compasses and more particularly to improvements in earth inductor compasses and generators therefor. This application is a division of my rotary coil or inductor compass application Serial Number 542,937 filed March 11, 1922, now patent No. 1,770,243, and is directed among other things to improved earth inductor potential generators for electrical compass systems and to the novel stabilized generator brush-gear and non-stabilized armature disclosed in the parent application.

Primarily an object of this invention is to produce an earth inductor or rotary coil compass and generator therefor which obtains its directive force from the earth's magnetic field by determining the direction of said field, which is dependable and which indicates and points out directions on a compass controller dial more accurately than compasses now in use, and which avoids many of the difficulties experienced with the ordinary magnetic compass.

Another object is to produce an improved compass which shows an indication of direction at one or more positions remotely located from the place at which the direction of the earth's magnetic flux is actually measured, which permits the measuring of the direction of the earth's magnetic flux at a position where it is least disturbed by iron masses or other local magnetic disturbances, and which permits an indication of the direction of the flux at any other place or places where it may be desired to know said direction.

It is a particular object to produce an electric compass system including an earth inductor generator, a compass controller, and a deviation indicator; and the generator of which has its armature axis unstabilized and mounted substantially on a horizontal axis, and the commutator brushes of which are stabilized. The brushes are stabilized to obviate any errors of current generation caused by the vertical component of the earth's magnetic flux which if occurring would cause inaccurate indication of the hand of the steering meter or deviation indicator.

While this compass will be found suitable and satisfactory for practically every purpose for which compasses are now used, it is particularly adapted for use on aircraft, where the ordinary magnetic compass is unsatisfactory in operation due to the movements of the craft and to the magnetic effect of the engines which in most cases are close to the position where the compass must be mounted so as to be seen by the pilot.

In electrical compasses heretofore proposed, certain practical difficulties have been inherent. These I have discovered and overcome in ways which will be described and explained in the following paragraphs.

The aforesaid difficulties inherent and otherwise have arisen both in the generation of the electric potential and in obtaining directive indications therefrom. The difficulties in generation have been due both to the effect of the movements of the craft upon which the compass was mounted and to the distortion of the earth's magnetic field by presence of the counter magnetomotive force due to the flow of electric current while indications were being produced. The solution of the first difficulty has been attempted by the stabilization of the generator, but this in itself has heretofore involved the addition of complicated or heavy auxiliary stabilizing apparatus. I have, in the present invention, stabilized only the generator current collecting or commutator brushes, and among other things, my invention is new in this respect. By stabilizing the brushes and maintaining them in substantially the same position in relation to the vertical or to the armature axis, irrespective of the generator itself, I have eliminated all sources of errors.

I accomplish the foregoing purposes by stabilizing the brushes as well as by predetermining the position of the generator axis, say substantially horizontal, or at any suitable angle in relation to the vertical, and by providing means to adjustably orient or rotate the entire generator to a position in the earth's field where no current is produced at the time of the indication of the correct direction, consequently there is no magnetomotive force generated, no distortion of the earth's field takes place, and consequently no error is introduced from this source to disturb the steering or deviation indicator.

The compass is unaffected and undisturbed by movements of the craft upon which it is carried if the armature and brushes of the generator are so related to each other and to the earth's field, that the inductor plane of the armature is maintained perpendicular to a plane defined by the armature axis and the direction of the earth's flux. By making the commutator brushes dirigible in azimuth and by stabilizing them either independently or in combination with the armature, the above relations may be maintained; and this invention has general and broad reference to stabilized current collecting brushes for a compass generator, the armature of which need not necessarily be stabilized.

By the "inductor plane of the armature" is meant a plane passing through the armature axis and having, for any particular generator, a fixed relation to the brush plane, that is, parallel to the brush plane or at some definite angle to the brush plane depending upon the type of armature winding, upon the method of connecting the armature winding to the commutator and upon the spacing between brushes. The brush plane is a plane passing through the brushes and coinciding with or lying parallel to the armature axis. The fixed position of the inductor plane with reference to the brush plane may be determined by moving the brush plane either by rotating the brushes or by rotating the armature axis or by rotating the brushes and rotating the armature axis until a galvanometer or other suitable indicator shows zero potential between the brushes. The inductor plane is then perpendicular to a plane coincident with the armature axis and lying parallel to the magnetic field.

If the armature be considered as having simple open coil windings, the "inductor plane of the armature" is the plane of any winding at the instant it reaches its mean position in circuit with the commutator brushes. If the armature be considered as having a single turn of wire connected to a single pair of commutator segments of width equal to the width of the brushes, the inductor plane of the armature is the plane of this turn of wire at the instant when the commutator segments and brushes are in matched position. If the armature be considered as having any form of winding with any number of turns of wire and any number and width of commutator segments, the inductor plane has the same fundamental relation to the brushes as in such single wire form.

Obtaining of directive indications from the generated potentials have involved further difficulties. While some inventors have realized the advantage of using a deviation indicator or steering meter which will give a null reading when the craft is upon the desired course, all have failed to recognize the advantages of so coordinating the generator and deviation indicator that no current flows when the craft is upon the desired course. I have combined with a generator having the before-described characteristics, an electric transmission and course deviation indicating system free from the defects of previously proposed electric compass systems, my compass system being not only theoretically correct but mechanically correct as well and of great practical use upon aircraft and elsewhere.

The accompanying drawings show my electrical compass system in its simplest form and illustrates it in part diagrammatically.

Figure 1 shows a plan view of a manually operable compass controller with which is combined a compass dial or card adapted to rotate with the controller, and the desired direction to be followed is set upon this compass controller dial by revolving it around to an index or lubber's line.

Figure 2 is a plan view of a generator adapted to be driven in the earth's field to produce electrical potential, and in some cases a compass dial similar to that in Figure 1 is combined with the generator to facilitate readings taken from the instrument.

In Figures 1 and 2 there is shown a telemetric connection, as for example a chain or other suitable means, interconnected between the compass controller and the generator by which the navigator or pilot adjustably rotates or resets the generator to swing it into a non-generating position in order to obtain a null reading on the direction indicator.

Figure 3 shows the electric deviation or steering indicator which indicates zero when the craft is headed in the direction pointed out at the lubber's line on the compass controller card.

Figure 4 shows an enlarged side elevation of the potential generator, parts thereof being in section, and showing the gyroscopically stabilized generator brushes or current-collecting means by which the generator inductor plane, with the aid of the compass controller, is established or maintained constant.

Referring now more particularly to the drawings for a detailed description of the invention, and first describing the compass controller in Figure 1, there is shown a stationary base 6 upon which is rotatably mounted a direction compass controller dial or card 7 adapted to rotate about a shaft 8 secured to the base 6. A handle 9 is attached to the compass controller dial 7 by which it is manually rotated and by which the generator to be explained is adjustably oriented or rotated about the vertical. The base 6 carries a lubber's line 10 which is an index from which readings are taken from the graduated compass dial in setting the desired direction into the compass system. The compass dial is graduated in any suitable terms and is laid off with directional degree markings such as may be preferred in any approved type of compass dial.

In installing this electric compass system upon vehicles, as for example aircraft, the foregoing compass controller 6 may be placed at any convenient point so that it may be operated by the pilot or a navigator who directs the course of the craft and this will explain that more than one compass controller may be carried aboard the craft if desired and the one or more compass controllers are provided with suitable telemetric connections established with a rotatable turntable on which the potential generator is mounted as hereinafter explained.

An electrical potential generator is shown in Figures 2 and 4 and a stationary base 14 rotatably supports generator mounting means in the form of a wheel 15. The rotatable mounting means 15 may, if desired, be graduated to form a compass dial or card similar to the compass controller compass dial 7 hereinbefore described. The compass dial carried on the rotary mounting means 15 facilitates readings and observations, particularly where the generator is located remotely from the compass controller and where it may become necessary or merely convenient to observe the generator turntable dial 15. This rotary mounting means 15 is connected to the compass controller 6 by any suitable telemetric connection as for example, a transmission shaft and gearing, or more particularly by a chain 16 as shown in the drawings, and to this end, for the purpose of illustration, both the compass controller dial 7 and the rotary mounting means or gear wheel 15 are provided with gear teeth to carry the chain and the two dials are preferably made the same in diameter so that they rotate uniformly together in order that a lubber's line or index 17 fixed to the base 14 points to the same direction graduations on the generator dial 15 as the index 10 points to the direction controller dial 7.

The mechanical or operating connection 16 established between the direction compass controller dial 7 and the generator mounting wheel 15 enables a navigator or pilot to manually orient or adjust both instruments at the same time to a new position in order that he may set a certain direction, as for example N for North, on the controller dial 7 whereupon the same direction N on the generator dial will simultaneously register at the lubber's line index 17 fixed to the generator base 14. However, the compass dial itself shown laid out on the turntable 15 is only used on certain types of compasses and it follows that primarily the telemetric connection established between the controller and generator is to enable the operator to regulate and adjust or orient the coils of the generator in relation to the earth's lines of magnetic flux.

Support brackets 19 are anchored to the gear wheel 15 and an armature shaft 20 is in this instance horizontally journaled in these brackets. An armature core 21 with windings or coils 22 is fixed upon the armature shaft 20 and appropriate means are provided to spin or drive the generator armature 21. Any suitable driving means may be used, but in the present instance I have illustrated pneumatic drive means in the form of a turbine wheel 23 in alignment with an air jet 24 which directs a stream of air against the turbine wheel at appropriate speed thus rotating the generator coil 22 in the earth's flux thereby producing electric potential. As hereinbefore mentioned, the wheel 15 is rotatably carried on the base 14 and to this end a hollow shaft 25 acts as a bearing therefor and the air jet 24 connects with the hollow shaft 25 receiving therefrom air pressure for driving the armature 21 as aforesaid.

The armature in this instance is shown as having only one coil 22 which has its ends connected to two commutator segments 26 and 27. A pair of current collecting brushes 28 and 29 bear on the commutator segments and these brushes are carried in a brush-gear or holder comprising stabilized arms 30 integral with a hub 31 from which depends an integral pendulum frame 32 which swings underneath the armature shaft 20 and in which is mounted a stabilizing gyro element as will be described.

The aforementioned gyro element comprises a gyro frame 34 mounted vertically in the pendulum frame 32 and adapted to precess about a vertical axis or pivot points 35. A gyro rotor 36 is carried on an axle 37 mounted in the frame 34 and the rotor 36 is driven by any suitable means as will be described. A gyro centralizing means such as a spring 38 has one end thereof connected to the gyroscopic pendulum frame 32 and the other end of the spring is connected to the gyro frame 34, and this spring 38 functions to centralize the gyro element 34—36 and maintain it in normal position as shown. The entire gyro element as a whole is pendulous in order to bring the commutator brushes 28 and 29 to rest in a predetermined position and the gyroscope 34—36 is provided to maintain the brushes in that position during movement of the craft on which the compass is carried.

Suitable driving means are provided to spin the gyro rotor 36 and in this instance I have illustrated a pneumatic drive comprising a flexible tube air pressure line 40, one end of which connects with air pressure supply means such as the jet 24 and the other end of the tube 40 terminates in an air delivery jet 41 fixed in the pendulum frame 32 in alignment with the periphery of the toothed gyro rotor 36 and also the jet is preferably mounted in the plane of the gyro frame axis 35 to uniformly at all times project a stream of air against the notched gyro rotor. The flexible air delivery tube 40 permits the gyroscopic stabilizing means to swing relatively free of the generator shaft 20. It is to be understood that other means for driving the gyro 36 may be supplied, the main purpose in view being to provide suitable means for stabilizing the current collecting brushes 28 and 29 so that these brushes are maintained in a substantially horizontal plane or any other predetermined plane irrespective of the relative movement of the entire generator structure, and to this end the brushes or brush-holding means is stabilized by operation of a gyroscope appropriately associated therewith since the gyro element 34—36 resists any tendency of the pendulum frame 32 to swing.

Since the generator unit shown in Figures 2 and 4 is installed on a vehicle as an aircraft by fixing the base 14 to the frame of the craft and inasmuch as the rotary mounting means 15 carrying the inductor generator is maintained parallel to the base 14 irrespective of its relative rotation therewith, it follows that the entire generator structure, with the exception of the stabilized brushes 28 and 29 and stabilizing means therefor, is subjected to the same pitching and rolling motion which the aircraft undergoes. Therefore I have interposed the stabilized brushes 28 and 29 with appropriate stabilizing means therefor between the generator and the aircraft thereby providing means for substantially maintaining the brushes 28 and 29 in a predetermined constant plane irrespective of the motion of the craft and the motion of the generator and in this way errors are eliminated from the indicating system.

As is well known to those versed in the art, the direction of the earth's magnetic flux is only horizontal at a few locations on the earth's surface and at most places is inclined at a considerable angle to the horizontal. The compass disclosed herein, as well as the usual type of magnetic compass, is caused to function by the horizontal component of the earth's flux. The vertical component of the earth's flux is responsible for the erratic action of the usual type of compass under certain conditions, and to eliminate the effect of the vertical component upon the compass of my invention, the brushes are stabilized, so as to gain maximum effect of the horizontal flux and minimize or eliminate all effects of the vertical flux lines.

Current collecting and transmitting means are provided by which the current produced by the generator is transmitted from the generator unit to any number of steering meters 43 shown in Figure 3 and located at convenient points aboard the craft. To this end electric transmission wires 44 connect with the stabilized current collecting brushes 28 and 29 and connect with resilient contact slip ring brushes 45 carried in brush holders 46 mounted in the rotary generator support 15. The slip ring brushes 45 bear against stationary contact rings 47 secured to the stationary generator base 14, and in this way the generator support 15 may be oriented freely about the vertical shaft 25 and without interfering with the transmission of current from the generator. An electrical transmission line 48 leads from the slip rings 47 to a deviation indicator or potential meter 43 or to any suitable number of such deviation indicators installed at various points on the craft for the convenience of those aboard.

The generator is preferably installed in the aircraft at some place remote from the engines and away from all other metal parts which might deflect the earth's flux lines and this remote location of course is readily permitted by reason of the operating connection 16 existing between the direction controller and generator. The direction controller 6 and deviation indicator or steering meter 43 may be placed anywhere without reference to the earth's flux lines since these two instruments are not in fact adversely effected by local magnetic field distortions.

In operation, the compass direction controller dial 7 is manually set by use of its handle 9 turned by the navigator to indicate the desired course at the lubber line 10. The generator, being mechanically connected to orient through the same angle as the compass controller dial 7, is therefore moved or adjustably oriented through the angle indicated in terms of direction by the compass controller. The aircraft is then steered until the deviation indicator 43 shows zero, at which time the heading of the craft will be that direction indicated on the compass dial 7 of the controller device 6.

To further illustrate the operation of the compass, I will first assume that the desired compass directions are as indicated on the graduated compass dials shown in Figures 1 and 2, which is to say that the axis f—f of the generator lies in the plane of the magnetic meridian. As the armature is rapidly driven, the coil 22 cuts the lines of flux of the earth's magnetic field. In the position shown, however, the coil 22 is not cutting any flux lines and is therefore in a zero potential position at the time it is in contact with the brushes 28 and 29 and is not generating current. While it is true that the radial portions of the coil are in reality cutting flux lines at this time, they are doing so in a direction opposite one to the other, which condition prevents generation of current. There is therefore at this time no existing potential between the brushes 28 and 29 and hence no effect is made on the galvanometer or deviation indicator 43 so that the indicating hand 50 thereof is not affected by the operation of the generator at this time because no potential exists and so it follows that the hand 50 points to zero and gives a null reading, the null reading itself meaning that the craft is traveling in that direction read on the controller compass dial at the index 10.

In the description in the foregoing paragraph of the operation of the electrical compass, it is to be noted that the direction controller compass dial 7 indicates north at the lubber line 10. Inasmuch as a null or zero reading appears on the deviation or steering indicator 43, it follows that the craft upon which the compass is mounted may in fact be traveling either north or the craft is perhaps traveling 180 degrees from north, namely south. This seemingly discrepancy in operation and in the directive function of the compass system will be better understood when one appreciates that the main function of the generator is simply to pick out, measure, or determine the direction in which the aircraft is traveling in relation to the known north and south general direction of the earth's flux lines, and this is accomplished by adjustably rotating the entire generator until its coils are parallel to and not cutting the earth's flux lines which condition of course exists in two directions, namely north and south, and so it is apparent that a direction 180 degrees off the indicated heading N. would also produce a null reading on the deviation indicator 43.

In order therefore that the pilot simply confirm or check his direction, he may steer slightly to the right or left to produce an indication on the steering or deviation meter 43. If a right hand turn of the craft causes the hand 50 to deviate or move to the right, the heading is correct. If a right hand turn of the craft causes the meter hand 50 to move to the left, the heading is 180 degrees from correct, and must be corrected accordingly by reversing the direction of the craft.

I will now assume that the craft turns to the right or clockwise as the generator coil 22 continues to be driven, and so the coil cuts lines of flux as aforesaid and it is apparent that a potential is generated in the coil which gives to the brush 29 a positive potential and to the brush 28 a negative potential. The electrical connections in the galvanometer deviation indicator 43 are such that this potential causes the hand 50 to move to the right thereby indicating that the vehicle is headed to the right of that direction set upon the compass controller dial 7; and if it desired to ascertain the actual direction in which the craft is moving at this time, the navigator or pilot simply takes hold of the controller handle 9 and rotates the dial 7 to the left or counterclockwise until the deviation indicator hand 50 returns to zero and reads null, whereupon the position of the index or lubber's line 10 read against the compass dial 7 then shows the new direction in which the vehicle is headed.

But, on the other hand, if it is desired to bring the vehicle back to that heading as indicated on the controller dial 7, said controller is not disturbed, but the vehicle instead thereof is steered around to the left until the indicator hand 50 reads zero.

It will be seen that I have disclosed stabilized generator brushes so related to the armature and earth's field together with a compass controller to orient the generator, that the inductor plane of the armature is maintained or established perpendicular to a plane defined by the armature axis and the direction of the earth's flux. Since the inductor plane of the armature is established perpendicular to a plane defined by the axis of the armature and the direction of the earth's flux, while the direction is being indicated, by stabilization of the armature or more particularly by stabilizing its brushes, no error is introduced by the movements of the craft upon which the compass is mounted. All sources of error which have been identified with previously proposed electric compass systems are therefore eliminated by the principles of my invention and the means constructed in accordance therewith for the reason that no potential exists and no current flows to the deviation meter 43 at the time it indicates the correct direction. It shows a null reading when the craft is headed in the desired direction, and so there is a complete absence of magnetomotive force, there is no distortion of the earth's field, and consequently no error is introduced from this source.

It is now understood how I have produced an earth inductor compass system or combination wherein the armature axis of a fieldless generator is disposed in a substantially horizontal position or in fact in other desired position along with current collecting brushes which are stabilized independently of the generator. The commutator brushes 28 and 29 are maintained in a uniform position and are capable of being adjustably oriented about the vertical.

The rotary mounting wheel 15 carries the armature and stabilized brushes and thus provide means for establishing or maintaining the inductor plane of the generator in a given position so as to produce a reliable indication on the electric steering or deviation meter 43.

The rotary mounting means such as the gear or wheel 15 on which is mounted the inductor compass generator includes a toothed periphery and this is also true of the compass direction controller dial 7. In this way a chain 16, or other suitable drive connection, is established between the remotely located controller and generator. Thus my inductor compass system includes a mechanical transmission means comprising for example parts 7, 16, and 15, by which the same angular motion of the controller is transmitted to the generator so that the controller and generator are geared or chain driven together for simultaneous orientable adjustment in azimuth.

The novel brush holding or mounting means includes for example the brush holder arms 30 and gyroscope therebelow to mount the brushes movably free about the commutator so as to enable the brushes to normally retain their predetermined position when the generator pitches or rolls with the craft; and the gyro frame 32 and rotor 36 are suspended from the brush arms. In this way I have stabilized the brushes alone and independently of the generator and its armature, and the brushes maintain a stabilized position throughout orientation thereof about the vertical pivot 25.

The independently stabilized commutator brushes together with the compass controller and mechanical transmission means effects the maintenance of the inductor plane of the armature perpendicular to a plane defined by the armature axis and the direction of the earth's flux so that a null reading appears on the electric deviation indicator when the craft is headed in that direction shown on the compass controller dial 7 by the lubber line 10.

What I claim is:—

1. A generator comprising an armature having a commutator and brushes, and a stabilizer on which the brushes only are mounted.

2. A generator comprising an armature having a commutator and brushes, and a stabilizer on which the brushes only are mounted, including means pendulously suspending the stabilizer from the axis of the armature to stabilize the brushes.

3. An inductor generator comprising a shaft carrying an armature having current-collecting means, a hub journaled on the shaft with arms projecting from said hub, the current-collecting means cooperating with the hub, and gyro stabilizing means pendulously suspended from the hub.

4. An inductor generator comprising a shaft carrying an armature having current-collecting means, a hub journaled on the shaft with arms projecting from said hub, the current-collecting means cooperating with the hub, a pendulum frame fixed to the hub and depending therefrom below the shaft, a gyro frame pivoted in the pendulum frame, and a rotor journaled in the gyro frame.

5. An inductor generator comprising an armature and commutator the axis of which is operatively disposed at an angle to the vertical, a gyroscopic means journaled on the armature axis, and brushes mounted in the gyroscopic means and stabilized in a predetermined position.

6. An inductor generator comprising an armature and commutator the axis of which is operatively disposed at an angle to the vertical, a hub journaled on the armature axis, parallel arms extending from the hub toward the commutator, brushes carried in the arms and bearing on the commutator, and a gyroscope pendulously depending from the hub to stabilize the arms and brushes.

7. An inductor generator comprising an armature including a winding and having current-collecting means, said armature being operatively mounted to rotate about an axis normally disposed at an angle to the vertical and to revolve the coil in the earth's field, stabilizing means cooperating with the current-collecting means to hold the latter in a given position, rotary-mounting means arranged to orient about a normally vertical axis and on which the armature is carried to orient the winding in relation to the earth's field, and means cooperating with the generator to orient the rotary-mounting means.

8. An inductor generator comprising an armature including a winding and having current-collecting means, said armature being operatively mounted to rotate about a normaly horizontal axis and revolve the coil in the earth's field, rotary-mounting means arranged to orient about a normally vertical axis and on which the armature is carried to orient the winding in relation to the earth's field, means cooperating with the generator to orient the rotary-mounting means, and means to stabilize the current-collecting means only in a predetermined position.

9. An inductor generator comprising, an armature having a commutator and brushes, said armature being mounted to rotate in the earth's flux about an axis normally disposed at an angle to the vertical, rotary-mounting means carried on a normally vertical axis and said armature being mounted on the rotary-mounting means, operating means coperating with the rotary-mounting means to orient the latter and hence orient the armature in relation to the earth's flux, and stabilizing means on which the brushes only are carried and maintained in a given position.

10. An inductor generator comprising an armature having a commutator and brushes, said armature being mounted to rotate in the earth's flux about an axis normally disposed at an angle to the vertical, rotary-mounting means carried on a normally vertical axis and said armature being mounted on the rotary-mounting means, operating means cooperating with the rotary-mounting means to orient the latter and hence orient the armature in relation to the earth's flux, a brush-carrying means pivotally mounted on the armature axis and including arms in which the brushes are held in running contact with the commutator, and a gyroscope cooperating with the brush-carrying means only to stabilize same.

11. An inductor generator comprising an armature having a commutator and brushes, said armature being mounted to rotate about a normally horizontal axis, rotary-mounting means carried on a normally vertical axis and said armature being carried by the rotary-mounting means, operating means cooperating with the rotary-mounting means to orient the latter and hence orient the armature in relation to the earth's flux; and stabilizing means on which the brushes are carried and maintained in a given position, including a pendulous member pivotally suspended from the horizontal axis.

12. A generator comprising a horizontally disposed shaft, an armature carried on the shaft and having a commutator and brushes, a bearing hub journaled on the shaft adjacent the commutator, horizontal arms projecting therefrom toward the commutator and said brushes being supported by the arms to bear on the commutator, and a vertically disposed gyro and frame therefor carrying rotor means under and attached to the hub, whereby the gyro stabilizes the hub on the shaft and hence holds the brushes in a predetermined position.

In testimony whereof I affix my signature.

MORRIS M. TITTERINGTON.